United States Patent [19]

Szakaly

[11] Patent Number: 5,047,700
[45] Date of Patent: Sep. 10, 1991

[54] UNIVERSAL COMPUTER CONTROL SYSTEM FOR MOTORS

[75] Inventor: Zoltan F. Szakaly, Tujunga, Calif.

[73] Assignee: The United States of America as represented by the Administrator of the National Aeronautics and Space Administration, Washington, D.C.

[21] Appl. No.: 172,105

[22] Filed: Mar. 23, 1988

[51] Int. Cl.⁵ ............................................. G05B 19/42
[52] U.S. Cl. .............................. 318/568.1; 318/568.2; 318/573; 364/513; 901/19
[58] Field of Search .................... 318/49, 87, 566–572, 318/599; 364/513; 901/18, 19, 20, 21, 22, 23

[56] References Cited

U.S. PATENT DOCUMENTS

| | | |
|---|---|---|
| 3,845,284 | 10/1974 | Taguchi et al. ................. 364/513 X |
| 4,099,107 | 7/1978 | Eder . |
| 4,300,080 | 11/1981 | Lee . |
| 4,362,978 | 12/1982 | Pollard et al. . |
| 4,420,812 | 12/1983 | Ito et al. ............................. 364/513 |
| 4,467,436 | 8/1984 | Chance et al. ...................... 364/513 |
| 4,475,160 | 10/1984 | Inaba . |
| 4,488,241 | 12/1984 | Hutchins et al. . |
| 4,524,313 | 6/1985 | Kuno et al. ...................... 318/565 X |
| 4,580,085 | 4/1986 | Eto et al. ........................ 318/571 X |
| 4,588,936 | 5/1986 | Itoh et al. ........................... 318/599 |
| 4,593,366 | 6/1986 | Sugimoto et al. ................... 364/513 |
| 4,599,545 | 7/1986 | Moriki et al. ................... 318/599 X |
| 4,611,296 | 9/1986 | Niedermayr ....................... 364/513 |
| 4,617,502 | 10/1986 | Sakaue et al. ....................... 318/568 |
| 4,621,331 | 11/1986 | Iwata . |
| 4,621,332 | 11/1986 | Sugimoto et al. . |
| 4,633,414 | 12/1986 | Yabe et al. ...................... 318/568 X |
| 4,639,652 | 1/1987 | Takahashi et al. . |
| 4,672,279 | 6/1987 | Hosokawa et al. .................. 318/568 |
| 4,698,777 | 10/1987 | Toyoda et al. .................. 318/568 X |
| 4,712,052 | 12/1987 | Omae et al. ..................... 318/573 X |
| 4,749,927 | 6/1988 | Rodal et al. ....................... 318/599 |
| 4,751,442 | 6/1988 | Kurakake ...................... 318/599 X |

FOREIGN PATENT DOCUMENTS 57-113118 7/1982 Japan .
60-209802 10/1985 Japan .
60-214007 10/1985 Japan .
60-230206 11/1985 Japan .

OTHER PUBLICATIONS

"Universal Computer Control System (UCCS) for Space Telerobots".

Primary Examiner—Paul Ip
Attorney, Agent, or Firm—Thomas H. Jones; Harold W. Adams; John R. Manning

[57] ABSTRACT

A control system for a multi-motor system such as a space telerobot having a remote computational node and a local computational node inter-connected with one another by a high speed data link is described. A Universal Computer Control System (UCCS) for the telerobot motors is located at each node. Each node is provided with a multibus computer system which is characterized by a plurality of processors with all processors being connected to a common bus leading to a command processor. The command processor controls joint hardware and/or software for a plurality of direct current torque motors of the type used in telerobot joints and telerobot hand-held controllers. The motors are connected to the joint processor cards and respond to digital control signals from the joint command processor and a joint motor control card. Essential motor operating parameters are sensed by analog sensing circuits and the sensed analog signals are converted to digital signals which are stored at the controller card for processing by the command processor.

33 Claims, 5 Drawing Sheets

UNIVERSAL COMPUTER CONTROL SYSTEM FOR MOTORS

The invention described herein was made in the performance of work under a NASA contract and is subject to the provisions of Public Law 96-517 (35 USC 202) in which the Contractor has elected not to retain title.

FIELD OF THE INVENTION

This invention relates to computerized motor control, and more particularly relates to an all-digital motor-sensing and motor-controlling computer control system.

BACKGROUND OF THE INVENTION

Space telerobot systems may contain forty or more motors under computer control. Most robot motor control prior to the advent of this invention was done on a customized basis with each manufacturer using a different controller design which was tailor-made to the motors being used. The result is that, in the past, there has been no universality, and existing components designed for one system could not readily be adapted for use in some other system. In addition to universality, there are many applications which require versatility and modularity. Space operations as described herein are typical of such applications.

Future space operations relating to space station, satellite and space platform servicing, maintenance and assembly call for an increased application of telerobots. The term telerobot denotes a mobile and manipulative machine which can be controlled in both teleoperator (man-in-the-loop) and robot (automatic/autonomous) modes of control. A typical machine of this category is illustrated in FIG. 1 of an article by the inventors hereto entitled "Universal Computer Control System (UCCS) for Space Telerobots", IEEE Proceeding of The International Conference on Robotics, 1987. The typical machine of FIG. 1 of that article has redundant arms, multi d.o.f. end effectors, and several TV cameras and light sources on independent multi d.o.f. platforms. The mobility unit itself, to which the dual-arm system is attached, can be a multi d.o.f. arm. The number of actuators or motors required to drive the articulated elements of a typical telerobot machine of this category can be thirty or more. Teleoperator mode of control with telepresence implies feedback to the manual controller and requires that the articulated elements of the multi (six or more) d.o.f. manual master controller be backdriveable by motors For controlling a dual-arm telerobot system in force-reflecting manual mode of control, fourteen or more motors will be integrated with the master arms in the control section. Whether teleoperator or robot control is involved, both locations must have essentially real-time information of what has transpired at the other location. In a teleoperator mode, software such as a display readout/visual display is essential.

Robotic control mode, by necessity, implies computer control of the motor elements of the robot machine. Teleoperator mode of control with force-reflecting and other sensing based telepresence capabilities also implies computer control of the master arms and motors. Two systems are described in Control of Remote Manipulators, *Handbook of Industrial Robotics*, Wiley, New York, Chapter 17, pp. 320-333, 1985 and S. Lee, G. Bekey, and A. K. Bejczy, computer Control of Space-Borne Teleoperators with Sensory Feedback, *Proceedings of the IEEE International Conference on Robotics and Automation,* St. Louis, MO, March 25-28, 1985, pp. 205-214.

Computer control in the past has involved hybrid systems in which at least some of the motors, in either the control or sensing loops, includes analog signals. A search of prior art related to this invention was conducted. The patents resulting from the search include the following:

| | |
|---|---|
| Inaba | 4,475,160 |
| Hutchins et al. | 4,488,241 |
| Niedermayr | 4,611,296 |
| Japan | 60-230206 |
| Japan | 60-214007 |
| Japan | 57-113118 |
| Eder | 4,099,107 |
| Lee | 4,300,080 |
| Iwata | 4,621,331 |
| Sugimoto et al. | 4,621,332 |
| Pollard et al. | 4,362,978 |
| Takahashi et al. | 4,639,652 |

Of these above-identified patents, only a few require additional mention. First, attention is directed to Inaba 4,475,160. This reference, in FIG 2, discloses a circuit for sensing an abnormal condition in a robot arm motor including sensing the motor drive current by means of current sensor CT. Circuit ADC converts the sensed current to a digital signal and then CMR compares this digital signal with preset limit values. See column 3, line 60 to column 4, line 34. Also, see column 5, lines 9-46.

Next attention is directed to Hutchins et.al. 4,488,241. This reference, in FIGS. 5-8, discloses a computer controlled robot arm system wherein a plurality of robot arms are controlled by a computer with control signals and feedback signals traversing a data bus. See FIGS. 5-8 and column 7, lines 43 to column 8, line 5. The Hutchins et.al. reference particularly emphasizes its ability to deal with abnormal conditions for robots (column 1, lines 56-65) and using motor drive current for sensing and control (column 2, lines 11-20). Hutchins et.al. also employs computer data for control with the capability of dynamically inserting correctional data in the robot instructional data (column 2, lines 21-27).

Next, attention is directed to Niedermayr 4,611,296 which discloses a robot arm control circuit including a plurality of tactile sensors providing feedback signals from the robot arm to a programmable sensor interface for generating kinematic control signals See FIG. 1 and column 4, line 58 to column 5, line 35.

Next, attention is directed to Japan 60-209802 which discloses a circuit for sampling the load current of a robot arm motor and processing the sampled data with a RAM to determine if the load current has exceeded a preset limit.

Next, attention is directed to Japan 57-113118 which discloses a robot control system which stops robot operation when the driving current exceeds a preset limit.

Japan 60-214007; Eder 4,099,107; and Lee 4,300,080 all disclose a closed loop servo system wherein motor current is sensed and fedback for control purposes.

A flexible computer control is eminently the most reasonable approach when the manual master controller is not a kinematic and dynamic duplica of the robot arm, but instead takes the form of a generalized force-reflecting hand controller which is interfaceable to any robot. Such a master controller is exemplified by an experimental device that has been developed at the Jet Propulsion Laboratory (JPL). In that experimental device, the kinematic and dynamic relations between master and robot arms are established through mathematical transformations embodied in computer programs in the control station. See A. K. Bejczy and J. K. Salisbury, Jr., Kinesthetic Coupling Between Operator and Remote Manipulator, *Computers in Mechanical Engineering*, Vol. 1, No. 1, July 1983, pp. 48–60.

The large number of computer controlled motors in space telerobot systems, and the inherent requirement of their computer control coordination, was the motivation behind the JPL research and development of a Universal Computer Control System ("UCCS") for all of the motor elements of a space telerobot system. A review of the above-noted patents and publications discloses that none of the relevant prior art discloses the hardware/software features of this UCCS invention including, in particular, all-digital signals throughout the UCCS.

SUMMARY OF THE INVENTION

A control system for a multi-motor system is described. A Universal Computer Control System (UCCS) for the telerobot motors of a space telerobot having a remote computational node and a local computational node is located at each node. Each node is provided with a multibus computer system which is characterized by a plurality of processors with all processors being connected to a common bus master and including at least one joint command processor. The joint command processor controls joint hardware and/or software for a plurality of direct current torque motors of the type used in telerobot joints and telerobot hand-held controllers.

Each joint motor is assigned an address in the joint controller card, which address is addressable as though it were the command processor's own memory. Each joint motor is equipped with a quadrature encoder, and may but need not have a potentiometer and an electrically-operated brake. The motors are connected to the joint processor cards and respond to digital control signals sent from the joint command processor through the motor's joint controller card. Essential motor operating parameters are sensed by analog sensing circuits and the sensed analog signals are converted to digital signals for return from the motors to the joint controller card, and then from there to the joint command processor or a user terminal. Thus, all motor control and motor sensing parameters for a plurality of joint motors are via digital signals transmitted to and for the joint command processor and via joint processor controller cards which each control/sense the plurality of joint motors.

When a robot is first connected to the controller of the UCCS, it is not known which direction the joint motor of each robot's joint is going to move when positive voltage is applied. It is not known which direction the encoder will count if a particular robot joint is moved to what the user considers a positive direction. The polarity of the motor's potentiometer and brake is not known either. Position limits and origins must also be specified. These parameters, in accordance with this invention, are specified by an interaction between the user and the control system via a software accessible terminal. A software-responsive hardware device, such as a memory having a code generator, is provided in the joint command processor. The code generator is characterized by a predetermined program-writing capability which removes the user from the task of program writing.

The user also has to tell the UCCS what hardware components are present in the motors to be controlled. For example, a newly added joint motor may, but need not have, an encoder. Nevertheless, the non-encoder motor may be completely integrated into the UCCS After the user has supplied the parameters about the system's hardware, via the terminal, into the UCCS system, the joints are moved to find out the approximate inertia gravity and friction parameters. When the initialization is done, the values of these parameters are initially and temporarily stored in the code generator in the joint level command processor, and that processor in turn transfers these parameters to a permanent storage device which is located in the joint controller card.

The UCCS, in summary, provides for software control over the following sensing capabilities: (1) Quadrature encoder position; (2) Quadrature encoder index pulse; (3) Potentiometer position; (4) Motor current; (5) Shaft angular velocity; and (6) Motor power supply voltage. These sensing capabilities make it possible to calculate the following quantities: (1) Joint position; (2) Joint speed directly, not derived from joint position; (3) Joint acceleration, derived from joint speed; (4) Motor torque; (5) Load on motor; (6) Motor back-EMF constant; (7) Motor electrical resistance; (8) Motor winding temperature; and (9) Motor power supply status.

The UCCS software can identify and act upon the following problems: (1) Open or short in the motor circuit; (2) Broken encoder wire or constant voltage on an encoder input; (3) Potentiometer hardware problem; (4) Various component failures on the joint interface (5) Not enough power to drive motors; and (6) All card; motor simultaneously stop. The self-test and diagnosis capabilities at the motor drive level provide an essential source of information to higher level failure diagnosis and error recovery computer programs, and make a substantial contribution to reliable and fail-safe teleoperation and robot modes of control.

DETAILED DESCRIPTION OF THE DRAWING

Figure 1:
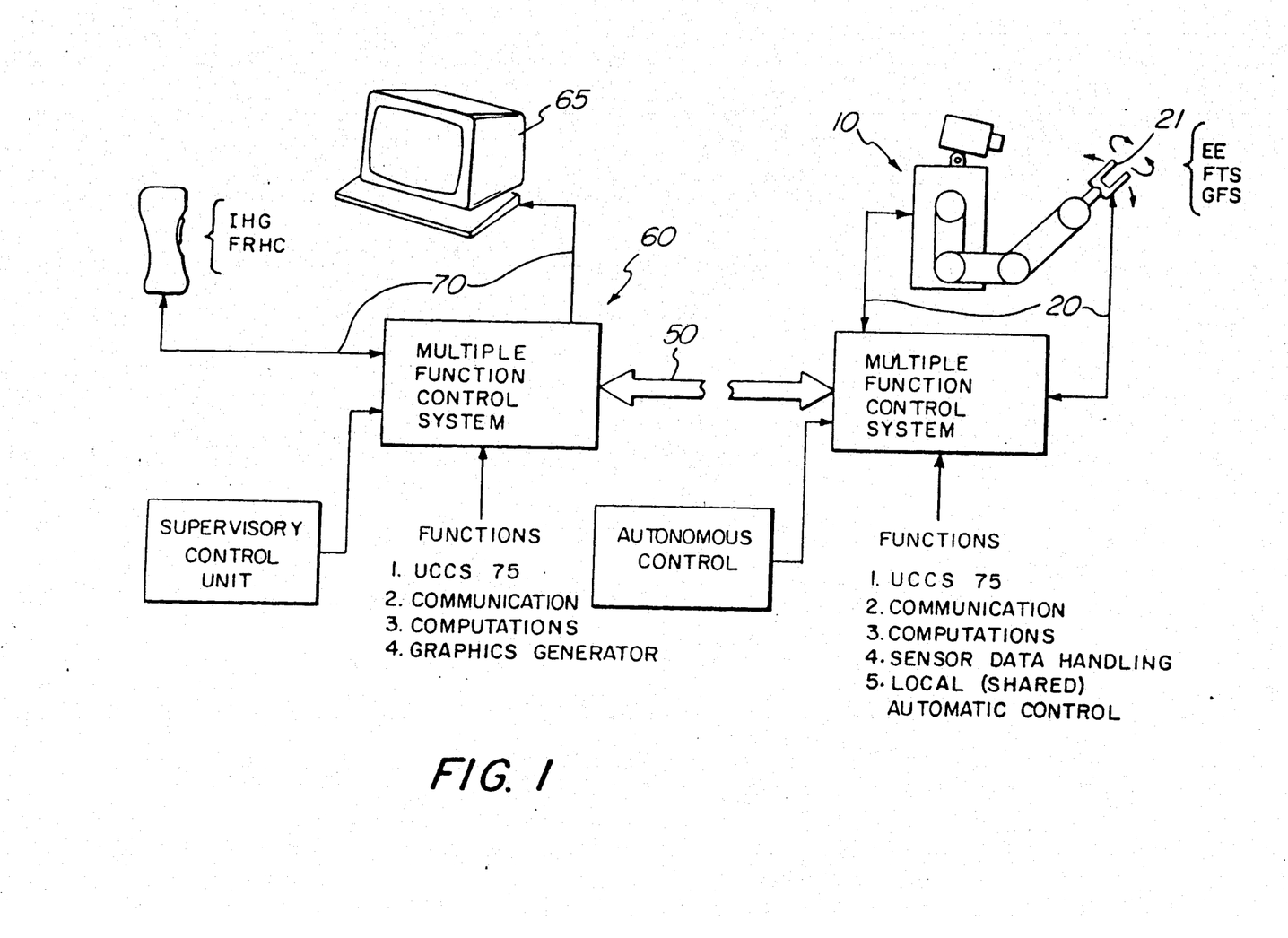
FIG. 1 is a highly simplified block diagram of a distributed multibus-based computing architecture for telerobot control, in accordance with this invention.

FIG. 1 depicts the general operating environment for the invention. A space telerobot 10 at a remote location is shown connected to a local control station 60 by a two-way communication link 50.

The normal operation of a space telerobot 10 in Earth orbit requires two physically separated computation nodes one node at the telerobot site and one node at the control station. The control station 60 can be in Earth orbit or on Earth. The two computation nodes are connected through a high speed data link 50.

At each node, a distinct and distributed set of computational functions have to be performed such that data is shared by or transmitted to the various data handling and computing subnodes. Also at each node, many motors have to be computer controlled using data from various sensors and from several computational subprograms. These requirements necessitate a tight integration of motor control programs with other data handling and computational subprograms.

The natural needs and generic requirements of distributed but tightly integrated computing is provided by a multibus computer architecture at either or both locations. Multiple bus masters 20 (telerobot) and 70 (control station) operating in a closely coupled environment enable sharing of information from various sources within a processing node. For example, the ability to share memory space makes it easy to synchronize and coordinate telerobot control and sensor data handling, in real time, at either the telerobot or control station sites.

The overall computing system based on multibus configuration, in one preferred embodiment, uses Intel Multibus I and National Semiconductor (NS) 32000 series microprocessors. More details on this architecture can be found in A. K. Bejczy, R. S. Botson and Z. Szakaly, Computing Architecture for Telerobots in Earth Orbit, *Proceedings of SPIE Conference on Advances In Intelligent Robotic Systems,* Cambridge, MA, Oct. 26-31, 1986, incorporated herein by this reference.

The right side of FIG. 1 indicates the telerobot site and the left side of the figure indicates the control station site. The abbreviations on the figure on the left side denote IHG: instrumented hand grip having a proportional trigger and multiple function switches; FRHC: force-reflecting hand controller having six degrees-of-freedom and six motors, and capable also of providing to a user/terminal 65 position and rate commands about the motors being controlled. On the right side of the figure the abbreviations denote: EE: end effector (robot hand); FTS: force-torques sensor at the base of the end effector for sensing all three orthogonal forces and moments; GFS: grasp force sensor which senses grasp force at the base of the claws or robot fingers. The smart hand 21 contains electronics including a microprocessor integrated into the hand 21 for sensor data handling and automatic hand control.

UCCS denotes universal computer control system for motor control. The important point to note is that UCCS for motor control at both sites is integrated into the computer multibus architecture. The general features of UCCS performance include: rich motor state sensing and control capabilities at high I/O rate, capability of driving various kinds of motors economically, compactness of drive and computing hardware and software, extensive safety, self-test, diagnosis and error recovery capabilities, and easy data communication with higher level control processors in the multibus architecture. These features are described in detail hereinafter.

In brief summary, the general sensing capabilities of UCCS to be described hereinafter are as follows:

Encoder count (12 bit hardware counter, unlimited software count).

Encoder index (direct hardware reset or software sense).

Shaft angular velocity (time measured between encoder pulses).

One general purpose A/D input per joint.

Potentiometer position.

Motor current.

Inductive freewheeling current (current during PWM off cycle).

Motor power supply voltage.

Shaft motion status (moves/stopped, direction of motion).

Power amplifier status (on-off).

Three TTL digital inputs for every four joints.

UCCS, briefly summarized, can take the following general control actions:

Output 8 bit + sign PWM command.

Turn power amplifier on-off.

Enable/disable short circuit protection.

Apply/release electromagnetic brake.

Enable regenerative braking in either direction.

Output to any of the two digital output bits per joint.

The UCCS hardware 75 is shown below the dashed line in FIG. 2. The three major UCCS hardware components are the following: joint level processor 100, up to 4 joint controller cards 110, 180, etc., and up to 16- pulse width modulated (PWM) power amplifiers, 120, 190, etc. Motor power is supplied by a power supply 115. A plurality of motors, such as motors 160, 161, etc., are controlled by the PWM amplifiers 120, 190 over control leads 170, 171. Each motor includes a plurality of sensors such as sensors 164, 165. FIG. 2A shows an index pulse 40 and two phased output pulse trains 41, 42 of the type normally delivered by a motor's optical encoder. Parameters from the motors 160, 161 are returned to the joint controller cards 110, 180 from motor sensors 164, 165 by sensor signal return leads 151, 152.

The joint level processor card 100 in the preferred embodiment includes the following components: NS 32016 microprocessor, floating point compressor, interrupt control unit, 32K ROM, 128K RAM, MULTIBUS interface, BLX bus interface, parallel port, and 2 serial ports. The joint level processor 100 can control up to four joint controller cards, 110, 180 etc. over the BLX bus 150. Processor 100 shares computational data with other processors over multibus 90.

Figure 3:
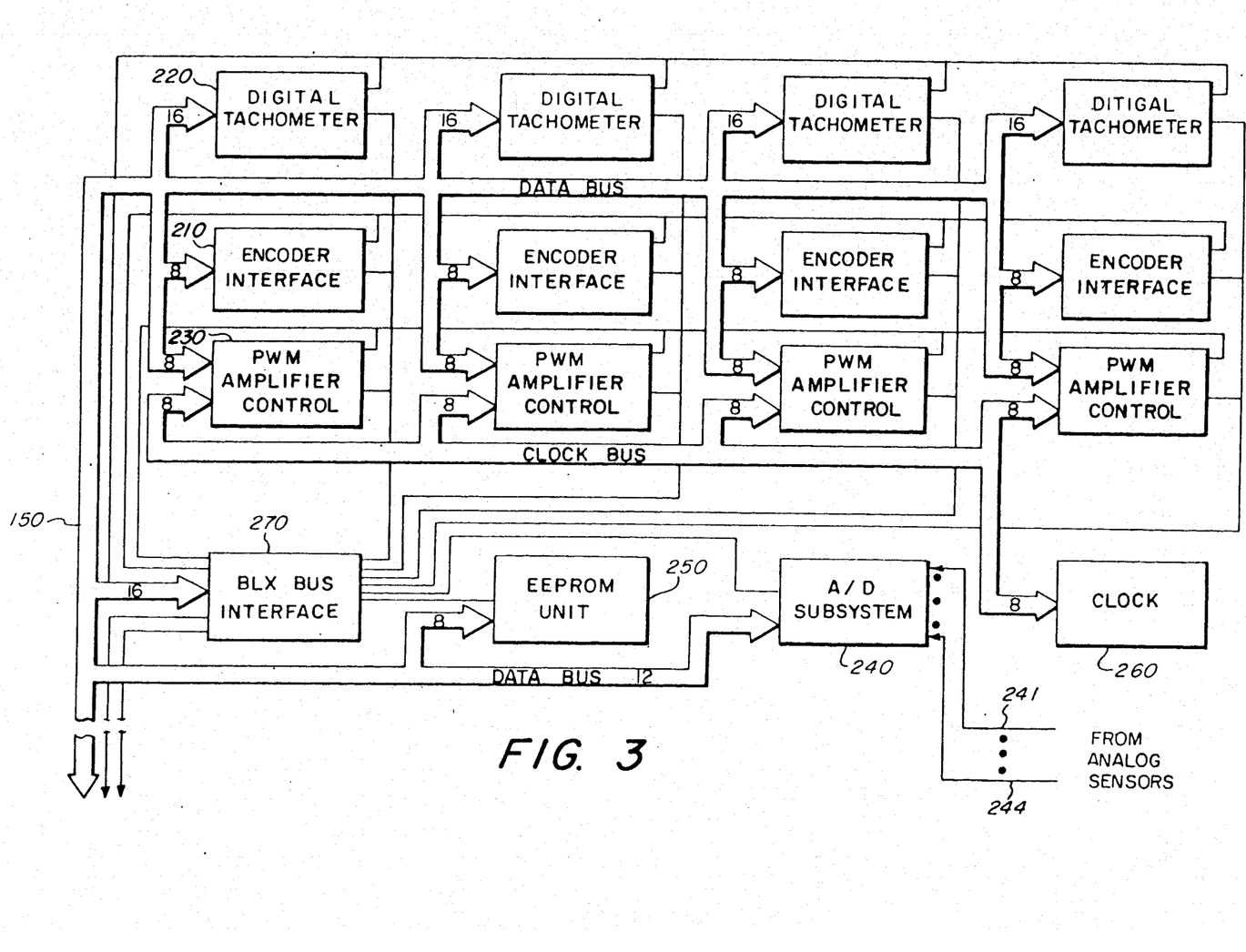
FIG. 3 is a block diagram of a joint controller card for the UCCS of this invention.

FIG. 3 depicts a general block diagram of a UCCS joint controller card 110 or 180. The joint controller cards 110, 180 each control up to four joints each, and they have the following components: encoder interface 210 (1 per joint), digital tachometer 220 (1 per joint), PWM amplifier control unit 230 (1 per joint), A/D subsystem 240 (1 per card), EEPROM subsystem 250 (1 per card), on-board clock 260 (1 per card), and BLX bus interface 270 (1 per card). These components are built entirely of HCMOS integrated circuits with the exception of the A/D converter subsystem that is an NMOS hybrid unit.

Each joint controller card has 3 general purpose digital inputs (not shown), 4 general purpose analog inputs 241-244 (0-5 range) from analog sensors at the motors being controlled by the card of FIG. 3, and 8 general purpose digital outputs (not shown). BLX bus 150 has sixteen bit capability and the various bit groups such as 16, 12, 8 etc., as shown within the double-lined arrows of FIG. 3, are used at certain of the components.

Bus interface 270 has:

Inputs: 3 BLX address lines read/write signals EEPROM select line

Outputs: 4 joint select signals and their inverses read/write pulses

The on-board clock generator 260 generates an 8 bit signal that counts at a rate of 3.07 MHz. The 8 lines represent a binary number that constantly counts up and goes back to 0 after 255. All 8 bits are updated synchronously. The entire bus is supplied clock pulses from the clock generator 260, and certain bits are used throughout the card. The basic clock signal is provided by a crystal oscillator. The outgoing pulses are derived from the on-board clock in clock source 260, and the carrier frequency is 25kHz. The encoder interface 210, FIG. 3, is a quadrature encoder interface, which performs the following functions: digital filtering of the incoming signal; up-down counting depending on the phase of the incoming pulses; and optional counter-reset when an index pulse 40, FIG. 2A, is detected.

Encoder 210 has;

Inputs:
  Encoder index input
  Read pulse
Outputs:
  One 8 bit port.

Figures 2, 2A:
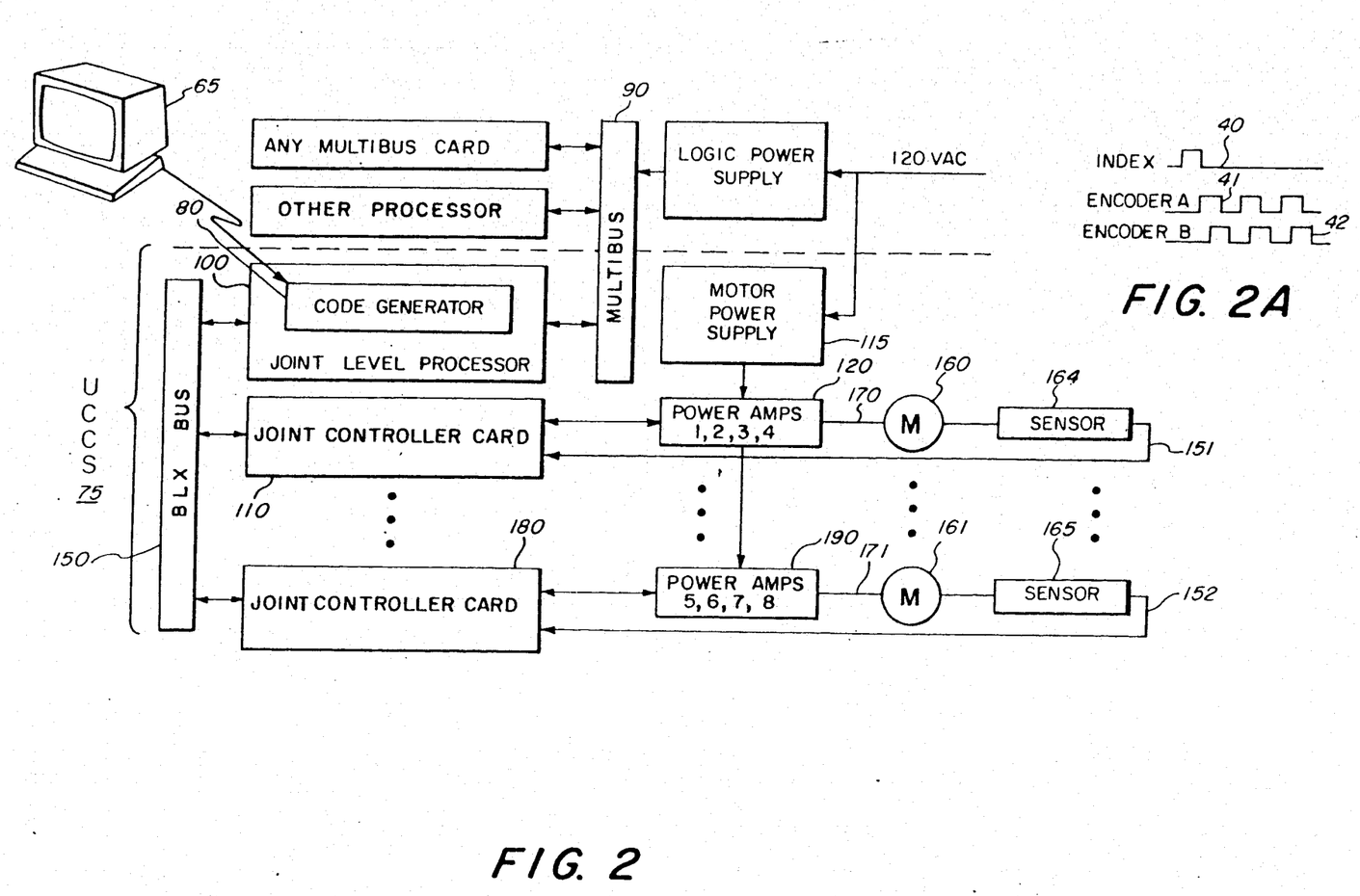
FIG. 2 is a general block diagram of the multibus based system of FIG. 1, and includes the major hardware components of the UCCS of this invention.
FIG. 2A is a simplified waveform of typical optical encoder pulses.

Pulses 41, 42, and an index pulse 40, FIG. 2A, are delivered to the encoder interface 210 from an optical encoder, such as sensor 164, FIG. 2, on a driven joint motor 160. A counter in interface 210 may be used in either an 8 bit or a 12 bit count mode. A longer internal count may be software generated by periodic reading of these counter values.

UCCS has an all-digital tachometer 220, FIG. 3. The tachometer 220 is a device that provides fast and accurate motor shaft angular velocity reading. The velocity reading is achieved by utilizing an already existing optical encoder on the joint motor thereby requiring no additional hardware that would complicate the motor structure or increase it's weight the way an analog tachometer does. A digital tachometer 220 also has a much higher bandwidth than an analog version. The digital tachometer 220 has digital logic for detecting if the motor has stopped. The logic can also detect the direction of motor motion by use of pulse trains 41, 42. Referring to the pulses 41, 42 of FIG. 2A, the transitions thereof may be defined 0 1 2 3, 0 1 2 3 . . . if the motor is moving in one direction and 3 2 1 0, 3 2 1 0 . . . if it is moving in the other direction.

Digital tachometer 220 makes it possible to use a high sampling rate in the controlling loop for the following reason: if an analog tachometer is used with its low bandwidth, velocity damping is hard to implement since the reading is not up-to-date. Calculating the velocity from position difference is very difficult in an analog device since there is either no, or only a bit or two difference in error. The error in such an analog tachometer may be as high as 50%. The most reliable and efficient way to get an accurate velocity reading is to use the digital tachometer 220 in accordance with the UCCS invention. This novel method and structure makes it possible to calculate motor acceleration very accurately.

Figure 5:
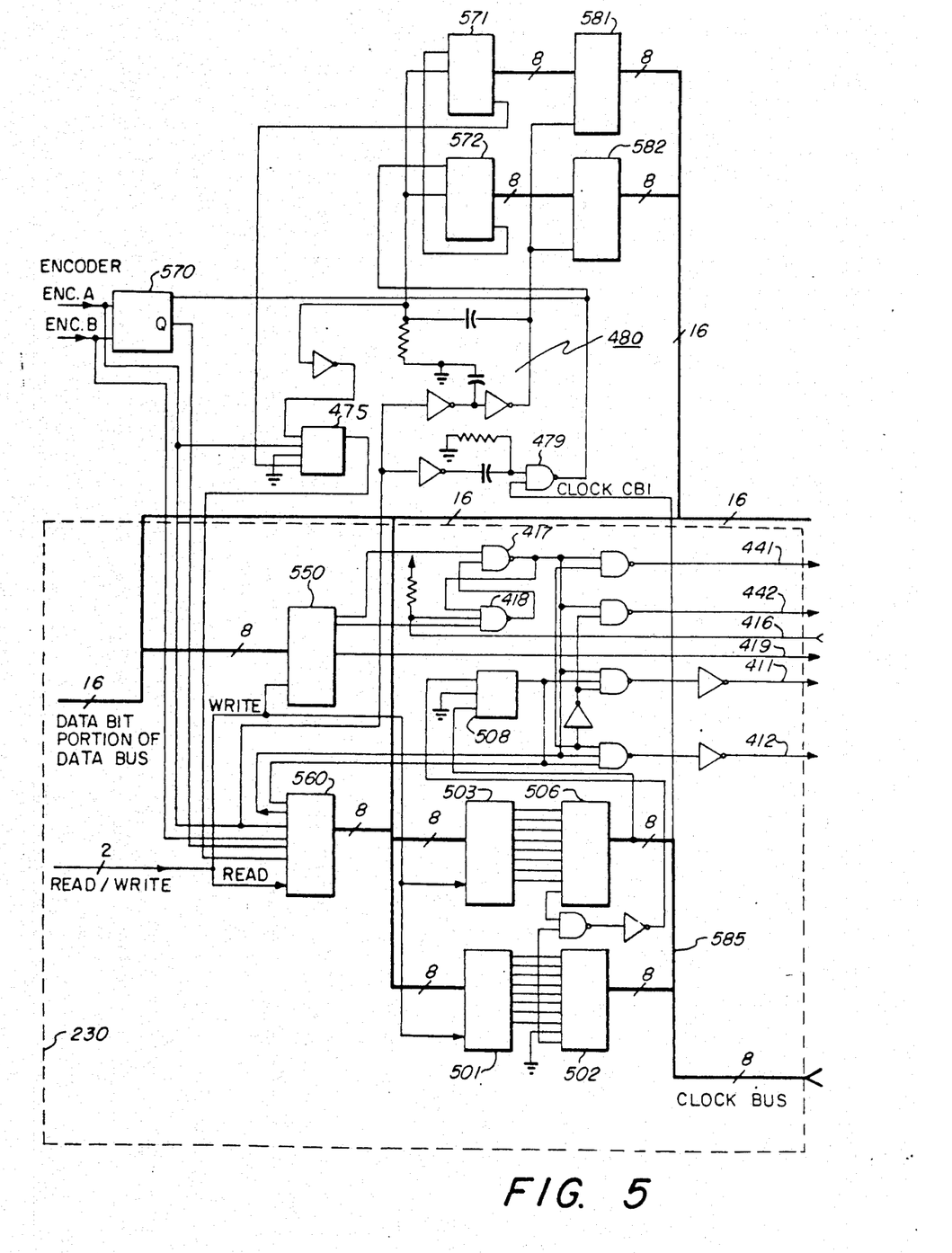
FIG. 5 is a detailed circuit diagram for relevant portions of FIG. 3.

Each of the digital tachometer(s) 220 consist(s) of circuitry as shown, in part, in FIG. 5. A tachometer 220 will include a circuitry to detect motor direction, the absence of motor motion and a count from which motor velocity and motor shaft acceleration may be computed. The motor direction is provided by a single bit value that depends on the current direction of the motor's motion. The motor's motion is indicated by logical 1 if the motor's shaft has not moved for an arbitrarily selected time such as the last 100 milliseconds (approximately). A time count is 16 bits with the last bit remaining a 1 in case of an overflow. If the last bit is a 1, the software concludes that the motor's velocity is slower than the range of the tachometer. Bus interface 270 is asynchronous, so double reading is provided; and if the two readings are different, they should be repeated. Calculating circuitry in the tachometer 220 calculates time and it is measured in 0.651 microsec units. Once calculated, is represented by a 16 bit value and the direction and motion sense are 2 additional bits.

A flip/flop circuit 570 monitors the encoder A and B pulses 41, 42 from the optical encoder of a controlled motor. The direction of rotation is sensed by the state of circuit 570. That state is also stored as a digital input in register 560. Software can read the digital signals stored in register 560, in order to ascertain operational data about the motor being controlled. Such data includes whether the motor is stopped or moving, and if moving, which direction the motor is rotating. One unique bit position and it's status indicated the motor's direction.

In tachometer 220, steering gate 479 steers clock pulses, from clock 260 via the clock bus, into a pair of daisy chain counting registers 571, 572. The encoder A pulse is steered into, and time is calculated by, counting registers 571, 572 based upon the allotted time between two positive transitions of encoder A pulses 41. Once time has been calculated, the result is stored as a digital value in memory registers 581, 582. Software 65, FIG. 1, reads the digital values stored in registers 581, 582. As the positive edge of the encoder A pulse 41 arrives, the following sequence of events takes place:

0 nanosecs
  The clock input at gate 479 is disabled and the counter 571, 572 freezes via the disabling circuitry 480 which is connected to gate 479 and to registers 571,572.
  The motor direction as detected in 570 is latched into the appropriate output port of register 560.
50 nanosecs
  A count value from register 571,572 is copied into the appropriate output ports of registers 581,582.
60 nanosecs
  The counters 571,572 and motion sensor 475 are reset.
100 nanosecs
  Gate 479 is enabled and a clock signal is allowed to pass through enabled gate 479 so that counting starts again.

Shaft velocity is calculated using the following formula: $V = const/N$ where N is the number read from the tachometer. Shaft acceleration may be calculated by: $A = const*(N1-N2)/(N1+N2)*N1*N2$ where N1, N2 are two consecutive tachometer readings. These tachometer readings from tachometer 220 are supplied to the system software by the connection to the user from processor 100, FIG. 2.

Absence of shaft movement is detected by a J-K flip/flop 475. Flip/flop 475 is reset by each encoder A pulse When the encoder pulses are absent for a predetermined time, a pulse (derived from register 571) causes the output of flip/flop 475 to go high and this high output from 475 is applied to register 560. The status of a unique bit position in register 560 supplies the motion information to the user via processor 100, FIG. 2.

Bus interface 270 includes a standard logic circuit for decoding the device select and read/write signals as well as the address lines to generate joint select and read/write signals that go to all the devices on the joint interface card of FIG. 3. Bus interface 270 at bus 150, is only 8 bits wide. Currently a 12 bit count value is employed and it must read in two nibbles in a manner that is well known. Between the two readings the output value at counters 581, 582 is frozen, but the counter 571,572 keeps counting. The unused 4 bits in the higher byte are presently being set to 0.

Each PWM amplifier control circuit 230 has two states, "ON" or "OFF". The ON state means normal operation. In the OFF state, all four power MOSFETs in each power amplifier being controlled are turned "off", so no current flows to the motor. A pair of motor power command outputs are applied by the motor power amplifier circuits such as 120, FIG. 2. Power output to the motor from a power amplifier is always governed by the lower-value of the two commands in the two controlling ports of the PWM amplifier control 230.

PWM amplifier control 230, with reference to FIG. 5, includes the following:
Inputs:
  8 bit motor command register 501,503.
  8 bit motor limit register 502,506.
  Read/write pulses.
  8 bit internal bus 585 counting at 3.07 Mhz. Short circuit sensor input 416 from a sensor circuit 415 shown in FIG. 4.
Outputs:
  pulse outputs 411, 412 to drive a duty cycle amount at the upper two MOSFETs 410, 420 of FIG. 4.
  2 level outputs 441, 442 for motor direction control via the lower two MOSFETs 450, 460, of FIG. 4.
  1 level output for the motor's brake circuit driver 435, via MOSFET 417, of FIG. 4.

Figure 4:
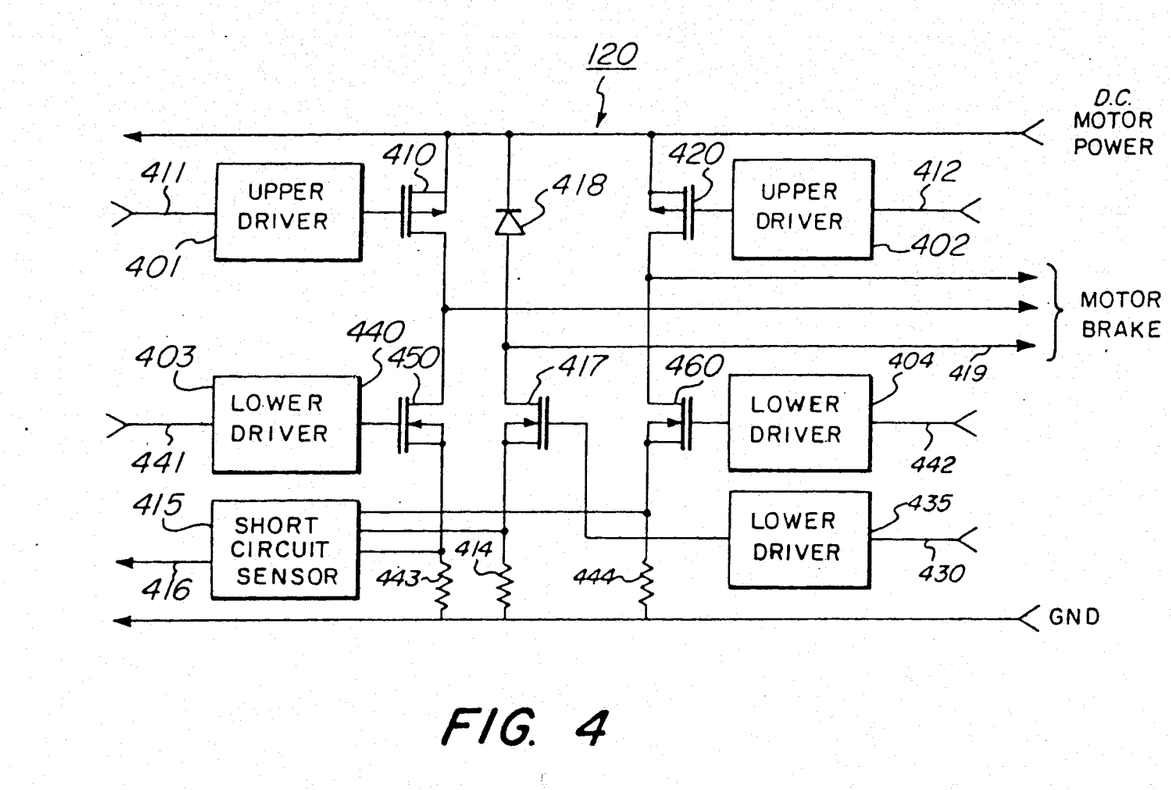
FIG. 4 is a simplified block diagram of a pulse width modulator power amplifier as depicted in block form in FIG. 2.

Each PWM power amplifier 120 includes a MOSFET H bridge with current feedback resistors 443, 444 and short circuit protection 415, 416 as shown in FIG. 4. Each amplifier 120 has one high current on-off MOSFET switch 417 that can be used for controlling an electro-magnetic brake, or other circuitry via lead 417. The H bridge data is as follows:
Breakdown voltage: 200V
Max continuous current: 17A
Max current for short time: 70A
Total on resistance: 0.2 ohm
Output voltage rise/fall time: 150 nanosecs
PWM Carrier frequency: 25 kHz The PWM amplifier control unit 230 produces the control pulses that control the status of and the duty cycle of the H-connected MOSFETs 410,420,450 and 460 of FIG. 4. Diagonally opposed control of a pair of MOSFETs is used to control the direction of rotation. The duty cycle at either one of the upper two MOSFETs 410, 420 controls the amount of motor drive power.

For safety there are three alternative ways to shut down a motor being controlled by a PWM amplifier 120: (1) turn the power amplifier control 230 off; (2) write zero in motor command register 501, 502; and (3) write zero in motor limit register 503, 506. The range of the command is by digital signals at values selected between zero up to a maximum or two hundred and forty-nine ("0-249"). Two registers 506, 502 control a flip/flop 508 to be set or reset as necessary to gate the duration of the motor power signal. For example, circuit 508 may be "set", or turned on, when a count difference is zero, i.e., the same in both registers 506 and 502. Flip/flop 508 will be reset, or off, when the command number in register 502 is reached, or when a motor reaches a pre-stored limit of counter 506. Any component failure of the pulse generator limits the motor command to always be less than the commanded value. This is true even in case of multiple failures.

Each power amplifier 120 requires a pulsed input so that a constant high level on its input will cause the power amplifier 120 to be shut down within 100 microseconds instead of continually applying high power to the motor being controlled. A short circuit detector 415, FIG. 4, causes the pulse generator to turn off, thus, putting all four MOSFETs in their high impedance state. The pulse generator can also be turned ON or OFF by software via terminal 65, and the short circuit detector 415 can also be disabled by software at 65.

During operation, digital control signals for each individual motor are delivered by processor 100 via BLX bus 150 into the PWM amplifier control 230. Such digital signals are stored by a write signal in a motor command register 501, FIG. 5. The motor limits are already stored in register 503 of FIG. 5. Assuming that a motor to be controlled is within its acceptable position limits, a digital command signal, placed in register 501, controls the direction of rotation of the motor. The digital signal in register 501 commands the amount of power to be applied to the motor's armature.

Assume, in this example, that the motors desired rotational motion is clockwise. In FIG. 4, the lower left driver 403 must be turned "ON". Also, the upper right driver 402 must receive a pulse width modulated duty cycle pulse. If the motor command is an amount of, say 125 out of the 0-249 range, then the duty cycle at upper driver 402 is fifty percent. Accordingly, upper driver 402 is on for a time corresponding to 125 units out of the 250 possible pulse width units which are available for motor control. If the rotation amount that was desired was a clockwise value of 50, then upper driver 402 receives a twenty percent duty cycle pulse, i.e., ON for 50 units and OFF for 200 units. Rotation in the opposite direction is controlled in a like manner except that the upper left driver 401 receives the variable width duty cycle pulse and the lower right driver 404 is turned ON.

In FIG. 4, the short circuit sensor 415 monitors the current through the resistors 443, 414, and 444. If a short results in an oversupply of current that oversupply is detected by sensor 415. Sensor 415 then sends a signal to PWM amplifier control 230 via lead 416 (see FIG. 5), and card 230 immediately responds by turning off all four MOSFETs via drivers 401, 402, 403 and 404. The circuit schematic of FIG. 5 depicts the short circuit lead 416 and its steering gates 417, 418 which are employed to shut OFF all of the MOSFETs.

Lower driver 435, FIG. 4, is used, via MOSFET 417, to either turn ON or turn OFF an electromagnetic brake of any conventional type at the controlled motor. When a telerobot is powered down, the weight of its arm would cause the unpowered motors to freely rotate. As a result, the telerobot arm's is locked by a electromagnetic brake to hold its arm in its raised position.

A non volatile memory in EEPROM unit 250 is provided to store hardware specifics when the unit is powered down. This memory 250 can only be accessed sequentially and its content is copied over to a RAM in the joint processor 100 when the UCCS system is powered up. EEPROM 250 is connected to a sequential address generation logic that increments the address whenever the EEPROM 250 is read from or written to.

Software 65, FIG. 2, originally inputs the hardware specifics about the motors being controlled by a joint level card by placing the information into the code generator 80; and then into EEPROM 250 by the operation as described above. The EEPROM subsystem 250, FIG. 3, consists of a 2 Kbyte EEPROM circuit and a bus interface. The EEPROM 250 may be read and written by the software sequentially. It preserves its content when the power is off. Writing one byte takes about 10 milliseconds.

The A/D converter of subsystem 240 performs the following functions:

Multiplexing, amplifying, low pass filtering of signals and 12 bit A/D conversion.

The A/D converter 240 is used to measure the following analog signals:
Motor current
Inductive free-wheeling current
Potentiometer position
Motor supply voltage
Other general purpose A/D input (1 per joint)

Each encoder interface(s) 210 contain(s): a digital filter to reduce the effect of noise on the encoder inputs; a quadrature decoding logic to control a counter; a 12 bit up-down counter; an 8 bit bus interface; and an inhibit logic to prevent the count from changing between reading of the high and low nibbles. The count range of the encoder interface is 0-4095. The software normally establishes a longer range by periodic reading of the counter and calculating the change from the previously read value. Optionally the counter may be used in the absolute count mode in which case the counter is reset to 0 by the hardware whenever the index pulse 41 is encountered. This latter automatic mode is the most convenient method, but it can only be used when the total motion range is less than 4096 counts. The status of the index signal may also be read by software 65.

The A/D subsystem 240, FIG. 3, is based on a 16 input A/D converter integrated-circuit multiplexed to 920 inputs externally. The A/D range is 0-5V. The following signals are measured through the A/D converter 240: potentiometer position, motor current, inductive current, motor power supply voltage, and one external voltage for every joint. The motor current signal is derived from the current feedback resistors that provide 1V when the motor current is 10 amps. This signal is low pass filtered and amplified before it goes to the A/D converter 240. It takes about 18 microseconds. The conversion result is read back as a word but the high four bits are currently masked off by software.

The BLX bus interface 270 makes it possible for the joint controller processor 100 to address the registers on the joint controller card 110 via the BLX bus 150. The BLX bus 150 has 8 distinct addresses so a matrix structure is used to access all registers for all 16 joints controlled. There is a joint select register that has to be loaded with the data word, selecting one or more joints. If more than one joint is selected, only writing is feasible to them. It is possible to shut down all motors with a single instruction if they are all selected.

The UCCS basic software has the following functions:
Joint control servo action.
Import of new data from shared memory.
Export of data to shared memory.
Import of data from parallel port.
Export of data to parallel port.
Interpolation between consecutive setpoints.
Compensation for slow changing variables such as supply voltage.
Hardware integrity verification.
User friendly interface for initialization, setup and debugging.

The UCCS software in our preferred embodiment is designed to maximally utilize the processing power of the NS 32016 processor and still be flexible enough to control the various applications it will be used for. Our engineering solution to this apparent contradiction, in accordance with our invention, is provided by a novel method wherein a code generator 80, FIG. 2, is "burned" into the system ROM, and when the telerobot application is to be defined, then the code generator 80 writes the particular program which is optimal for that particular application.

An additional advantage of this novel method is that the software can adopt to particularities like the polarity of the motor connections, making hookup of a new arm easier. The hardware information about the motors being controlled is stored in EEPROM unit 250 on the joint interface cards 110, 180. A user may build a robot arm or a system of arms using off-the-shelf motors with encoders, potentiometers or both, and connect them to the UCCS control system without regard to encoder, potentiometer or motor polarities. When the connections are made, a user can turn the system on and tell UCCS how many motors there are, what sensors they are equipped with, what their maximum motor voltage, motion range and so on should be. After this initialization, UCCS will maintain system parameters within the given limits and will control the motors in the desired manner. New data may arrive via the BLX Bus 150, FIG. 2, shared memory interface or via a parallel port. During use, the commanding processor 100 may select a different controlling mode or a different set of options which results in new code being generated by code generator 80 and subsequently executed.

Examples of the particular actions that may be taken by the generated code are as listed.

IN MOST FREQUENT CONTROL LOOP

Import a value from shared memory.
Generate new setpoint value.
Low pass filter new setpoint value.
Check new setpoint against limits.
Input data about current motor status.
Calculate control action.
Low pass filter control command.
Limit control command.
Export data to shared memory.
Output data to motor control hardware.

IN ONE OF THE LESS FREQUENT INTERRUPTS

Synchronize to external event.
Import a value from shared memory.
Calculate parameters for setpoint interpolation.
Calculate new values for the controller gains.
Calculate discrepancy between encoder and potentiometer position.
Check supply voltage.
Check motion parameters for limit violations.
Act on motor indirectly by modifying feedforward or limits of issued motor command.

In the code generator 80, FIG. 2, there are subroutines for every one of the above-listed possible actions. These subroutines take as an input a bit field that specifies the particularities of the system and options regarding the generated code. Another input is the joint number and data about the code preceding the action to be taken. The subroutine generates the code at the address specified depending on the input. The code generator 80 keeps track of registers and memory locations used and also of the current joint select status so that unneeded instructions are eliminated.

If the checksum of the EEPROM is incorrect at "power on", the UCCS system goes into the debug/initialize mode. In the debug mode, the user has a terminal connected to the main serial port of the joint control processor. The debug mode can also be entered by connecting the terminal and hitting a key a few times.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

I claim:

1. A universal computer control system for controlling and sensing the operating parameters of a plurality of motors that are software-controllable, said system having a command processor with a read/write memory address signal cycle, which command processor is dedicated to controlling said plurality of motors in accordance with a software program system itself, and said system comprising:

at least one controller card and a plurality of software-controllable motors which are connected to said controller card;

a signal user-accessible command processor connected to said controller card by a first digital bus;

a user-accessible code generator located in said command processor and responsive to user-initated inputs in order to control and/or sense the plurality of motors by said single command processor in accordance with digital signals sent to or from said controller card by said signal command processor;

digital storage means at said controller card accessible by read/write signals from said single command processor over said first digital bus, for storing at an address associated with each of said motors, user-initated software command written by said code generator, which software commands individually control or sense the operational status of any one of the plurality of motors connected to said controller card;

sensor circuits at each of said motors for delivering to said controller card, digital signals stored at the motor's address at said controller card, which signals are indicative of the operating status of each of said motors to be controlled by said card; and address means at said controller card accessible by said command processor over said first digital bus during the command processor's read/write memory cycle for transferring digital signals, indicative of said user-desired control and/or each individual motor's operational status, from said digital storage means at said controller card to said command processor.

2. A control system in accordance with claim 1 and further comprising:

additional controller cards and additional pluralities of software-controllable motors to be controlled/sensed, which motors are connected to said additional controller cards, and said additional controller cards being connected to said single command processor over said digital bus and being addressable during said command processor's read/write cycle so that all the motors connected to all of the controller cards are available to the user for control or parameter sensing by said software written by said code generator as implemented by said single command processor over said first digital bus.

3. A control system in accordance with claim 2 and further comprising:

a second digital bus connected to said command processor;

an additional command processor having its own read/write memory address signal cycle; and means connecting said additional command processor to said second digital bus whereby digital control or operational status signal so said plurality of motors connected to all of said controller cards can be shared by both command processors via signals transmitted over said second digital bus.

4. A control system in accordance with claim 1 and further comprising:

means sensing the operation of each one of said addressed motors for feeding back to each of said motor's address at said controller card a plurality of parameter signals indicative of the actual performance of each one of the addressed motors as being controlled.

5. A control system in accordance with claim 4 and 5 further wherein:

said operating parameters of each of said addressed motors are represented by analog signals.

6. A control system in accordance with claim 5 and further comprising:

an analog to digital converter for converting said analog signals indicative of the motor parameters to digital signals of a format suitable for storage at said digital storage means of said controller card; and means for feeding back to said controller card said digital signals from said A/D converter.

7. A control system in accordance with claim 1 wherein each motor is provided with an encoder for delivering pulses indicative of the rotation of said motor's shaft to said controller card, and said system further comprises:

counting means for emitting a count signal;

digital tachometer means responsive to the pulses derived from each motor's encoder for converting said system's count signal into a separate digital signal indicative of the rotational shaft speed of each of said motors being controlled by said system; and means for storing said shaft-speed-indicating signal in said digital storage means at said controller card where it can be read by said command processor.

8. A control system in accordance with claim 7 and further comprising at said controller card:

means for measuring the time between said encoder pulses from each of said motors; and means for relating said measured time to a digital signal indicative of the motor shaft's angular rotational velocity for each of said motors connected to said controller card.

9. A control system in accordance with claim 1 wherein each of said motors is provided with a motor supply signal, and said system further comprises:

a plurality of signal amplifiers, with one each of said plurality of amplifiers individually connected between one motor each of said plurality of motors and said one controller card; and means t each of said connected amplifiers responsive to said addressed command from said command processor as stored in said digital storage means at said controller card for individually controlling the motor's supply signal and direction of rotation in accordance with a signal supplied by said individual amplifiers to said individual motors.

10. A control system in accordance with claim 9 wherein each of said amplifiers is a variable amplifier and further characterized in that:

each of said variable amplifiers is a pulse-width modulated (PWM) amplifier which emits motor supply current to the motor in accordance with the width of a control pulse applied to a control terminal of said amplifier; and wherein said system further comprises:

a PWM amplifier control circuit individual for each of said amplifiers, and said amplifier control circuit being responsive to digital command signals from said control processor for controlling the width of the control pulses supplied by said amplifier control circuit to said control terminal of said PWM amplifier.

11. A universal computer-control system in accordance with claim 7 wherein said digital tachometer comprises:

digital logic means responsive to said motor's encoder pulses for sensing the direction of rotation of said motor shaft; and means at said controller card associated with said motor for setting a binary state in one of two states in accordance with the sensed direction of rotation of said motor's shaft.

12. A control system in accordance with claim 11 wherein said digital tachometer means further comprises:

means for measuring the elapsed time between two consecutive pulses from said motor's encoder and emitting a digital signal indicative thereof;

memory means in said tachometer for storing said digital signal emitted from said elapsed-time measuring means; and means connecting said tachometer memory means to said digital storage means in said controller card where said elapsed time may be read by said command processor.

13. A control system in accordance with claim 1 wherein:

said command processor is accessible by a user-initialed signals in order to initiate said self-written software by said code generator; and terminal means connected to said command processor for delivering digital signals stored in said storage means of said controller card to said user.

14. A control system in accordance with claim 7 wherein said tachometer means is:

an all-digital tachometer comprising digital logic means for registering if the motor's shaft has not moved for a predetermined time.

15. A control system in accordance with claim 10 wherein said PWM amplifier control circuit in said controller card further comprises:

a digital command signal register for storing a digital command indicative of the amount of power to be supplied to a motor being controlled by the PWM amplifier control circuit; and means responsive to said digital command in said register for controlling the width of the control width of the control pulses supplied by said control terminal of said PWM amplifier.

16. A control system in accordance with claim 15 wherein said PWM amplifier control ciciuit further comprises:

register means for receiving from said command processor a digital signal indicative of the desired direction of rotation for said motor; and means responsive to said direction command as stored in said register means be said command processor for controlling the direction of current supplied by said PWM amplifier to the motor being controlled.

17. A universal computer control system having a control processor with a memory storage device that is software accessible by a user, said control processor being dedicated to control/sense a plurality of software-controllable motors, and said system further comprising:

a code generator in said memory storage device of said control processor with a predetermined code therein for electronically writing a control program to control said plurality of motors in accordance with the motor configuration that are supplied to said code generator by said user;

a plurality of software-controllable motors connected under common control of a single dedicated control processor;

means available to said user and connected to said code generator for supplying to said control processor the hardware configuration and operating parameters for each one of said plurality of motors to be controlled by said system; and means responsive to said electronic software program as written by said code generator and taking into account said hardware configuration and said operating parameters as input into said processor by said user, for emitting a plurality of command signals to control the operation of each one of said plurality of motors by said dedicated control processor.

18. A universal computer control system in accordance with claim 17 and further comprising:

means sensing the operation of each one of said motors being controlled for feeding back to said control processor a plurality of parameter signals indicative of the actual performance of each one of the motors as they are being controlled.

19. A universal computer control system in accordance with claim 18 and further wherein:

said operating parameters of each of said addressed motors are represented by analog signals.

20. A universal computer control system in accordance with claim 19 and further comprising:

an analog to digital converter for converting said analog signals indicative of the motor parameters to digital signals of a format suitable for said dedicated control processor; and means for feeding back said digital signals from said converter to said dedicated control processor.

21. A universal computer control system in accordance with claim 17 and further comprising:

a digital bus interconnecting said control processor with said digital control signal emitting means for transmitting the digital command signals to the motors being controlled.

22. A universal computer control system in accordance with claim 17 wherein each motor is provided with an encoder for delivering pulses indicative of the direction of rotation of said motor's shaft, and said system further comprises:

counting means for emitting a count signal; and tachometer means responsive to the pulses derived from each motor's encoder for converting said system's count signal into a separate digital signal indicative of the rotational shaft speed of each of said motors being controlled by said system.

23. A universal computer control system in accordance with claim 22 and further comprising:

means for measuring the time between said encoder pulses from each of said motors; and means for relating said measured time to the motor shaft's angular rotational velocity for each of said motors.

24. A universal computer control system in accordance with claim 17 wherein each motor of said plurality is provided with a motor supply signal and further comprising:

a plurality of signal amplifiers, with one each of said plurality of amplifiers individually connected to one motor each of said plurality of motors; and means at each of said amplifiers responsive to said processor for individually controlling the motor supply signal supplied by said amplifiers to said individual motors.

25. A universal computer control system in accordance with claim 24 and further wherein:

each of said amplifiers is a variable amplifier.

26. A universal computer control system in accordance with claim 25 wherein:

each of said variable amplifiers is a pulse-width modulated (PWM) amplifier which emits motor supply current to the motor in accordance with the width of a control pulse applied to a control terminal of said amplifier; and wherein said system further comprises:

a PWM amplifier control circuit individual for each of said command signals from said control processor for controlling the width of the control pulses supplied by said control circuit to said control terminal of said PWM amplifier; and a digital bus interconnecting said PWM amplifier control circuit with said control processor.

27. A universal computer-control system in accordance with claim 22 wherein said tachometer means comprises:

an all digital tachometer including digital logic means responding to said motor's encoder pulses for sensing the direction of rotation of said motor shaft; and digital logic means at said tachometer for storing a digital signal indicative of the direction of rotation of said motor's shaft.

28. A universal computer control system in accordance with claim 27 wherein said tachometer means further comprises:

calculating means for calculating the lapsed time between two consecutive pulses from said motor's encoder and emitting a digital signal indicative thereof; and memory means in said tachometer for storing said digital signal emitted from said calculating means.

29. A universal computer control system in accordance with claim 28 and further comprising:

a digital data bus connected to said memory means and said processor; and means responsive to a processor command for reading from said memory means said digital time signal.

30. A universal computer control system in accordance with claim 17 wherein:

said dedicated control processor is accessible by a user-initated software; and means in said system for delivering said digital time signal to said user.

31. A universal computer control system in accordance with claim 23 wherein said tachometer means comprises:

an all-digital tachometer comprising digital logic means for registering if the motor's shaft has not moved for a predetermined time.

32. A universal computer control system in accordance with claim 26 wherein said PWM amplifier control circuit further comprises:

a digital command signal register for storing a digital command indicative of the amount of power to be supplied to a motor being controlled by the PWM amplifier control circuit; and means responsive to said digital command in said register for controlling the width of the control width of the control pulses supplied by said control terminal of said PWM amplifier.

33. A universal computer control system in accordance with claim 31 wherein said PWM amplifier control circuit further comprises:

register means for receiving from said command processor a digital signal indicative of the desired direction of rotation for said motor; and means responsive to said direction command in said register means for controlling the direction of current supplied by said PWM amplifier to the motor being controlled.

* * * * *